(12) United States Patent
Zhang et al.

(10) Patent No.: US 11,727,312 B2
(45) Date of Patent: Aug. 15, 2023

(54) GENERATING PERSONALIZED RECOMMENDATIONS TO ADDRESS A TARGET PROBLEM

(71) Applicant: International Business Machines Corporation, Armonk, NY (US)

(72) Inventors: Xue Ying Zhang, Xi'an (CN); Jing Xu, Xi'an (CN); Xiao Ming Ma, Xi'an (CN); Jing James Xu, Xi'an (CN); Ying Xu, Xi'an (CN); Ang Chang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 16/559,395

(22) Filed: Sep. 3, 2019

(65) Prior Publication Data
US 2021/0065029 A1 Mar. 4, 2021

(51) Int. Cl.
*G06N 20/20* (2019.01)
*G06N 5/045* (2023.01)
(Continued)

(52) U.S. Cl.
CPC ........... *G06N 20/20* (2019.01); *G06F 18/214* (2023.01); *G06F 18/22* (2023.01); *G06N 5/045* (2013.01); *G06N 20/10* (2019.01)

(58) Field of Classification Search
CPC .. G06K 9/6215; G06K 9/6256; G06K 9/6282; G06N 20/10; G06N 20/20;
(Continued)

(56) References Cited

U.S. PATENT DOCUMENTS 6,041,311 A 3/2000 Chislenko et al.
2018/0314990 A1* 11/2018 Xue .................. G06Q 10/04
(Continued)

FOREIGN PATENT DOCUMENTS

CN 101290626 A 10/2008
CN 104462385 A 3/2015
(Continued)

OTHER PUBLICATIONS

Wikipedia, "Cluster Analysis," https://en.wikipedia.org/wiki/Cluster_analysis, 2018, pp. 1-18.
(Continued)

*Primary Examiner* — Brent Johnston Hoover
(74) *Attorney, Agent, or Firm* — Robert A. Voigt, Jr.; Shackelford, Bowen, McKinley & Norton, LLP

(57) ABSTRACT

A computer-implemented method, system and computer program product for generating personalized recommendations to address a target problem. A machine learning prediction model directed to a target problem for an individual is built with historical data. After receiving data about the individual, a prediction for the individual is obtained in connection with the target problem by the built model using the received data about the individual. Key predictors (e.g., parameters) and their weight for the individual are generated using the prediction by an explanation model. Record(s) are identified from the historical data by performing similarity analysis of the historical data using the key predictors and their weight. Such records provide a population closely related to the individual with respect to the target problem. These records are then analyzed and recommendations are provided to a user to solve the target problem for the individual based on the analysis of the identified record(s).

20 Claims, 8 Drawing Sheets

(51) Int. Cl.
*G06N 20/10* (2019.01)
*G06F 18/22* (2023.01)
*G06F 18/214* (2023.01)

(58) Field of Classification Search
CPC .......... G06N 3/08; G06N 5/003; G06N 5/045; G06N 7/005; G06N 5/01; G06N 7/01; G06F 18/214; G06F 18/22; G06F 18/24323
See application file for complete search history.

(56) References Cited

U.S. PATENT DOCUMENTS

2019/0050750 A1* 2/2019 Le .................... G06N 3/0427
2020/0226502 A1* 7/2020 Liu ................... G06Q 10/025
2021/0073671 A1* 3/2021 Puri .................. G06N 20/00

FOREIGN PATENT DOCUMENTS

| CN | 106610970 A | 5/2017 |
| CN | 107463645 A | 12/2017 |
| CN | 108763314 A | 11/2018 |
| CN | 109241405 A | 1/2019 |
| CN | 109684538 A | 4/2019 |

OTHER PUBLICATIONS

White et al., "Predicting User Interests from Contextual Information," SIGIR'09, Boston Massachusetts, USA, Jul. 19-23, 2009, pp. 1-8.
Zukerman et al., "Precitive Statistical Models for User Modeling," User Modeling and User-Adapted Interaction, vol. 11, 2001, pp. 5-18.
Pulkit Sharma, "Comprehensive Guide to Build a Recommendation Engine from Scratch (in Python)," Jun. 21, 2018, pp. 1-71.

* cited by examiner

| | 401 | 403 | 402 | 404 | 405 | 406 | 407 | 408 | 409 | 410 | 411 | 412 | 413 | 414 | 415 |
|---|---|---|---|---|---|---|---|---|---|---|---|---|---|---|---|
| | ID | REAPPEARED TIME | REAPPEARED | CURED | SURGICAL OPERATION | MEDICINE TYPE | MEDICINE TIME (MONTHS) | DIAGNOSIS | AGE | WEIGHT | ALCOHOL CONSUMPTION | YEARS OF ALCOHOL CONSUMPTION | SMOKE | YEARS OF SMOKING | RADIUS_MEAN |
| | 742302 | 0 | NO | YES | YES | A | 20 | M | 54 | 55 | 1 | 11 | 1 | 15 | 17.99 |
| | 742517 | 0 | NO | YES | YES | C | 26 | B | 36 | 68 | 1 | 15 | 0 | 0 | 13.57 |
| | 743009 | 0 | NO | NO | YES | B | 30 | M | 47 | 49 | 0 | 0 | 0 | 0 | 19.69 |
| | 743482 | 9 | YES | YES | YES | A | 18 | M | 61 | 58 | 1 | 16 | 1 | 20 | 11.42 |
| 400 | 743584 | 0 | NO | YES | NO | D | 10 | M | 55 | 51 | 1 | 21 | 1 | 21 | 20.29 |
| | 743789 | 0 | NO | YES | YES | C | 36 | B | 41 | 61 | 1 | 17 | 1 | 17 | 12.75 |
| | 744359 | 6 | YES | NO | YES | B | 20 | M | 39 | 71 | 0 | 0 | 0 | 0 | 18.25 |
| | 744502 | 0 | NO | YES | NO | A | 24 | B | 66 | 56 | 1 | 31 | 0 | 0 | 13.71 |
| | 744981 | 8 | YES | YES | NO | E | 18 | B | 51 | 59 | 0 | 0 | 1 | 15 | 13 |
| | 745001 | 0 | NO | YES | YES | A | 16 | M | 38 | 63 | 1 | 13 | 0 | 0 | 12.46 |

304 — DATA OF AN INDIVIDUAL

| ID | DIAGNOSIS | AGE | WEIGHT | ALCOHOL CONSUMPTION | YEARS OF ALCOHOL CONSUMPTION | SMOKING | YEARS OF SMOKING | RADIUS_MEAN |
|---|---|---|---|---|---|---|---|---|
| 843786 | | 39 | 63 | 1 | 15 | 1 | 17 | 12.45 |

303 — PREDICTION ADDED

| ID | DIAGNOSIS | AGE | WEIGHT | ALCOHOL CONSUMPTION | YEARS OF ALCOHOL CONSUMPTION | SMOKING | YEARS OF SMOKING | RADIUS_MEAN |
|---|---|---|---|---|---|---|---|---|
| 843786 | B | 39 | 63 | 1 | 15 | 1 | 17 | 12.45 |

FIG. 4

| ID | DIAG-NOSIS | AGE | WEIGHT | ALCOHOL CONSU-MPTION | YEARS OF ALCOHOL CONSU-MPTION | SMOKE | YEARS OF SMOKING | RAD-IUS_MEAN | TEXTURE_MEAN | PERI-METER_MEAN | AREA_MEAN | SMOOTH-NESS | COMPACT-NESS_MEAN | CONCA-VITY_MEAN | CONCAVE POINTS_MEAN | SYM-METRY | FRACTAL DIMENSION | RADIUS_SET |
|---|---|---|---|---|---|---|---|---|---|---|---|---|---|---|---|---|---|---|
| 842302 | M | 54 | 55 | 1 | 11 | 1 | 15 | 17.99 | 10.38 | 122.8 | 1001 | 0.1184 | 0.2776 | 0.3001 | 0.1471 | 0.2419 | 0.07871 | 1.095 |
| 842517 | M | 36 | 68 | 1 | 17 | 0 | 0 | 20.57 | 17.77 | 132.9 | 1326 | 0.08474 | 0.07864 | 0.0869 | 0.07017 | 0.1812 | 0.05667 | 0.5435 |
| 843009 | M | 47 | 49 | 0 | 0 | 0 | 0 | 19.69 | 21.25 | 130 | 1203 | 0.1096 | 0.1599 | 0.1974 | 0.1279 | 0.2069 | 0.05999 | 0.7456 |
| 843482 | M | 61 | 58 | 1 | 16 | 1 | 20 | 11.42 | 20.38 | 77.58 | 386.1 | 0.1425 | 0.2839 | 0.2414 | 0.1052 | 0.2597 | 0.09744 | 0.4956 |
| 843584 | M | 55 | 51 | 1 | 21 | 1 | 21 | 20.29 | 14.34 | 135.1 | 1297 | 0.1003 | 0.1328 | 0.198 | 0.1043 | 0.1809 | 0.05883 | 0.7572 |
| 843786 | B | 39 | 63 | 1 | 15 | 1 | 17 | 12.45 | 15.7 | 82.57 | 477.1 | 0.1278 | 0.17 | 0.1578 | 0.08089 | 0.2087 | 0.07613 | 0.3345 |
| 844359 | M | 45 | 71 | 0 | 0 | 0 | 0 | 18.25 | 19.98 | 119.6 | 1040 | 0.09463 | 0.109 | 0.1127 | 0.074 | 0.1794 | 0.05742 | 0.4467 |
| 844502 | B | 66 | 56 | 1 | 31 | 1 | 0 | 13.71 | 20.83 | 90.2 | 577.9 | 0.1189 | 0.1645 | 0.09366 | 0.05985 | 0.2195 | 0.07451 | 0.5835 |
| 844981 | B | 51 | 59 | 0 | 0 | 1 | 15 | 13 | 21.82 | 87.5 | 519.8 | 0.1273 | 0.1932 | 0.1859 | 0.09353 | 0.235 | 0.07389 | 0.3063 |
| 845001 | M | 38 | 63 | 1 | 13 | 0 | 0 | 12.46 | 24.04 | 83.97 | 475.9 | 0.1186 | 0.2396 | 0.2273 | 0.08543 | 0.203 | 0.08243 | 0.2976 |

FIG. 5

| ID | REAPP-EARED TIME | REAPP-EARED | CURED | SURG-ICAL OPERA-TION | MEDICINE TYPE | MEDICINE TIME (MONTHS) | DIAG-NOSIS | AGE | WEIGHT | ALCOHOL CONSU-MPTION | YEARS OF ALCOHOL CONSU-MPTION | SMOKE | YEARS OF SMOKING | RAD-IUS_MEAN | TEXTURE _MEAN | PERI-METER _MEAN | AREA _MEAN | SMOOTH-NESS | COMPACT-NESS_MEAN | CONCA-VITY _MEAN | CONCAVE POINTS_MEAN |
|---|---|---|---|---|---|---|---|---|---|---|---|---|---|---|---|---|---|---|---|---|---|
| 742302 | 0 | NO | YES | YES | A | 20 | M | 54 | 55 | 1 | 11 | 1 | 15 | 17.99 | 10.38 | 122.8 | 1001 | 0.1184 | 0.2776 | 0.3001 | 0.1471 |
| 742517 | 0 | NO | YES | YES | C | 26 | B | 36 | 68 | 1 | 15 | 0 | 0 | 13.57 | 17.77 | 132.9 | 1326 | 0.08474 | 0.07864 | 0.1469 | 0.07917 |
| 743009 | 0 | NO | NO | YES | B | 30 | M | 47 | 49 | 0 | 0 | 0 | 0 | 19.69 | 21.25 | 130 | 1203 | 0.1096 | 0.1599 | 0.1974 | 0.1279 |
| 743482 | 9 | YES | YES | YES | A | 18 | M | 61 | 58 | 1 | 16 | 1 | 20 | 11.42 | 20.38 | 77.58 | 386.1 | 0.1425 | 0.2839 | 0.2414 | 0.1052 |
| 743584 | 0 | NO | YES | YES | D | 10 | M | 55 | 51 | 1 | 21 | 1 | 21 | 20.29 | 14.34 | 135.1 | 1297 | 0.1003 | 0.1328 | 0.198 | 0.1043 |
| 743789 | 0 | NO | YES | NO | C | 36 | B | 41 | 61 | 1 | 17 | 1 | 17 | 12.75 | 15.7 | 82.57 | 477.1 | 0.1278 | 0.17 | 0.1598 | 0.08189 |
| 744359 | 6 | YES | YES | YES | B | 20 | M | 39 | 71 | 0 | 0 | 0 | 0 | 18.25 | 19.98 | 119.6 | 1040 | 0.09463 | 0.109 | 0.1127 | 0.074 |
| 744502 | 0 | NO | NO | YES | A | 24 | B | 66 | 56 | 1 | 31 | 0 | 0 | 13.71 | 20.83 | 90.2 | 577.9 | 0.1189 | 0.1645 | 0.09366 | 0.05985 |
| 744981 | 8 | YES | YES | NO | E | 18 | B | 51 | 59 | 0 | 0 | 1 | 15 | 13 | 21.82 | 87.5 | 519.8 | 0.1273 | 0.1932 | 0.1859 | 0.09353 |
| 745001 | 0 | NO | YES | YES | A | 16 | M | 38 | 63 | 1 | 13 | 0 | 0 | 12.46 | 24.04 | 83.97 | 475.9 | 0.1186 | 0.2396 | 0.2273 | 0.08543 |

FIG. 6

GENERATING PERSONALIZED RECOMMENDATIONS TO ADDRESS A TARGET PROBLEM

TECHNICAL FIELD

The present invention relates generally to machine learning, and more particularly to generating personalized recommendations to address a target problem involving a population closely related to the individual with respect to the target problem.

BACKGROUND

Machine learning is the scientific study of algorithms and statistical models that computer systems use in order to perform a specific task effectively without using explicit instructions, relying on patterns and inference instead. Machine learning algorithms build a mathematical model based on sample data, known as "training data," in order to make predictions or decisions without being explicitly programmed to perform the task.

Models, such as prediction models, created using machine learning are currently limited to predicting the value of a particular field. Such prediction models do not provide personalized recommendations to address a target problem involving a population closely related to the individual with respect to the target problem. That is, machine learning prediction models are not able to address or solve concerns ("target issues") involving a population closely related ("closely related population") to the individual with respect to a target problem (e.g., what should the education plan for child A be?). For instance, machine learning prediction models are not able to solve a problem concerning which education plan should be used by child A by parents A and B. For example, when a couple seeks an education plan for their child A, children of group A have a similar age to child A, but children of group B have parents with a similar education background as the parents of child A. Current machine learning prediction models do not answer which group is better for referencing when the concern ("target issue") is education since they do not explore a population that is similar to the individual with respect to a target problem.

SUMMARY

In one embodiment of the present invention, a computer-implemented method for generating personalized recommendations to address a target problem comprises building a machine learning prediction model with historical data directed to the target problem for an individual. The method further comprises receiving data about the individual. The method additionally comprises obtaining a prediction for the individual in connection with the target problem by the built machine learning prediction model using the received data about the individual. Furthermore, the method comprises generating key predictors for the individual using the prediction by an explanation model. Additionally, the method comprises identifying one or more records from the historical data by performing similarity analysis of the historical data using the key predictors, where the one or more records provide a population closely related to the individual with respect to the target problem. In addition, the method comprises analyzing the identified one or more records. The method further comprises providing recommendations to a user to solve the target problem for the individual based on the analysis of the identified one or more records.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 4 illustrates using historical data to build the machine learning prediction model which provides a prediction for the individual based on the received data about the individual concerning the target problem in accordance with an embodiment of the present invention;

FIG. 5 illustrates the explanation model identifying the key parameters used to classify the person as being early stage breast cancer in accordance with an embodiment of the present invention;

FIG. 6 illustrates identifying similar historical records to provide a "closely related population" using similarity analysis in accordance with an embodiment of the present invention;

DETAILED DESCRIPTION

The present invention comprises a computer-implemented method, system and computer program product for generating personalized recommendations to address a target problem. In one embodiment of the present invention, a machine learning prediction model directed to a target problem for an individual is built with historical data. Data about the individual is received. For example, if the target problem of the individual is directed to whether the individual is at risk for early stage breast cancer, then the data about the individual may include parameters that may be important to make such a determination, such as age, years of alcohol consumption and image parameters (e.g., radius mean, concavity mean, concave points mean). After receiving data about the individual, a prediction for the individual is obtained in connection with the target problem by the built model using the received data about the individual. Key predictors (e.g., important parameters that are more likely to have an influence as to the outcome of the prediction) and their weight for the individual are generated using the prediction by an explanation model. Record(s) are identified from the historical data by performing similarity analysis of the historical data using the key predictors and their weight. Such records provide a population closely related to the individual with respect to the target problem. These records are then analyzed (e.g., what-if analysis, statistical analysis, modeling) and recommendations are provided to a user to solve the target problem for the individual based on the analysis of the identified record(s). As a result, the present invention provides the user a system for exploring a population that is similar to the individual with respect to a target problem. Recommendations are then created based on such an exploration.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
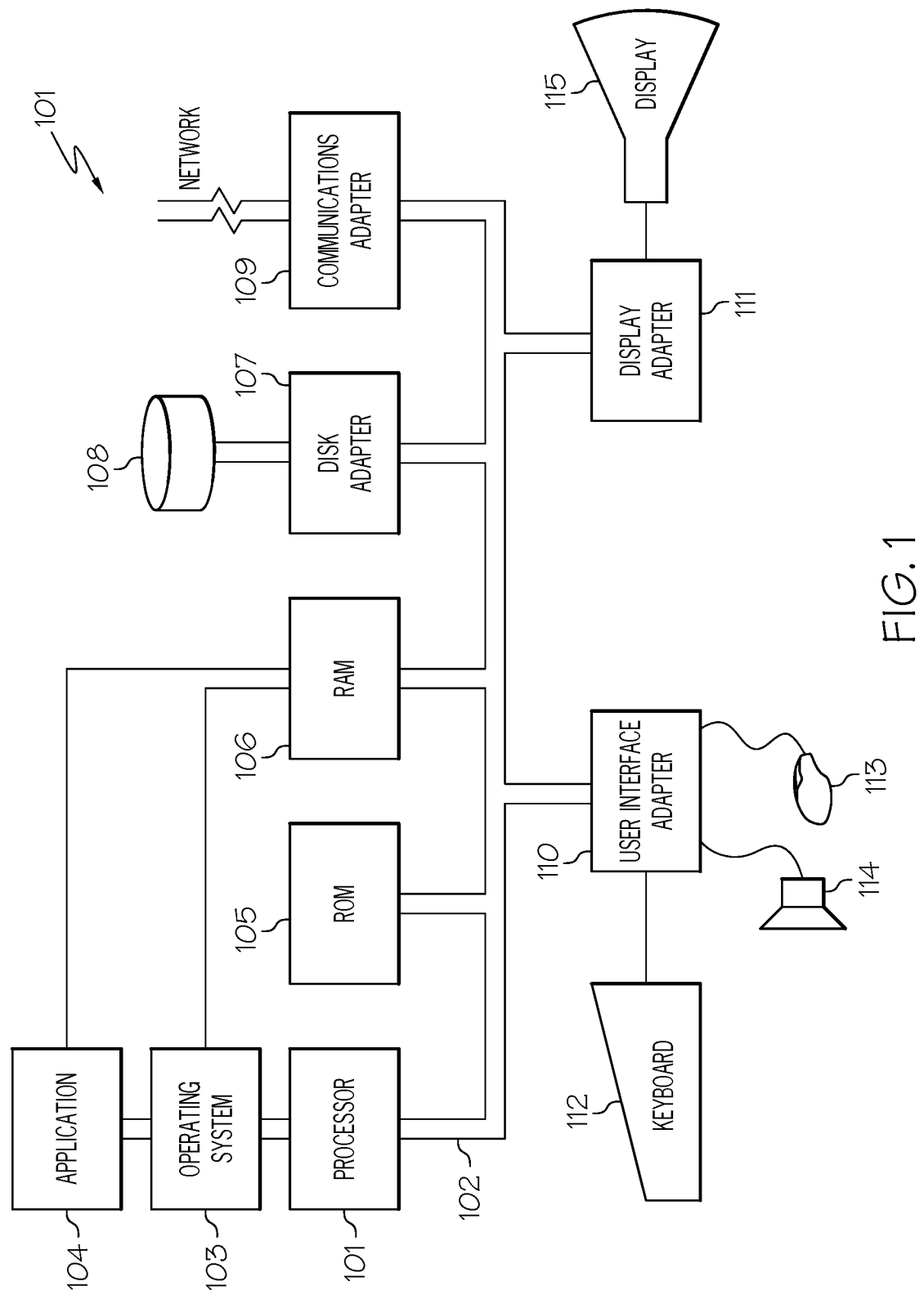
FIG. 1 illustrates an embodiment of the present invention of a hardware configuration of a computing device which is representative of a hardware environment for practicing the present invention.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of generating personalized recommendations to address a target problem. Referring to FIG. 1, computing device 100 may have a processor 101 connected to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for generating personalized recommendations to address a target problem by exploring a population closely related to the individual with respect to the target problem as discussed below in connection with FIGS. 2-9.

Referring again to FIG. 1, read-only memory ("ROM") 105 may be connected to system bus 102 and include a basic input/output system ("BIOS") that controls certain basic functions of computing device 100. Random access memory ("RAM") 106 and disk adapter 107 may also be connected to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for generating personalized recommendations to address a target problem by exploring a population closely related to the individual with respect to the target problem, as discussed further below in connection with FIGS. 2-9, may reside in disk unit 108 or in application 104.

Computing device 100 may further include a communications adapter 109 connected to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, machine learning is the scientific study of algorithms and statistical models that computer systems use in order to perform a specific task effectively without using explicit instructions, relying on patterns and inference instead. Machine learning algorithms build a mathematical model based on sample data, known as "training data," in order to make predictions or decisions without being explicitly programmed to perform the task. Models, such as prediction models, created using machine learning are currently limited to predicting the value of a particular field. Such prediction models do not provide personalized recommendations to address a target problem involving a population closely related to the individual with respect to the target problem. That is, machine learning prediction models are not able to address or solve concerns ("target issues") involving a population closely related ("closely related population") to the individual with respect to a target problem (e.g., what should the education plan for child A be?). For instance, machine learning prediction models are not able to solve a problem concerning which education plan should be used by child A by parents A and B. For example, when a couple seeks an education plan for their child A, children of group A have a similar age to child A, but children of group B have parents with a similar education background as the parents of child A. Current machine learning prediction models do not answer which group is better for referencing when the concern ("target issue") is education since they do not explore a population that is similar to the individual with respect to a target problem. Hence, current machine learning prediction models fail to create recommendations by solving problems involving a population closely related to the individual with respect to the target problem.

Figure 2:
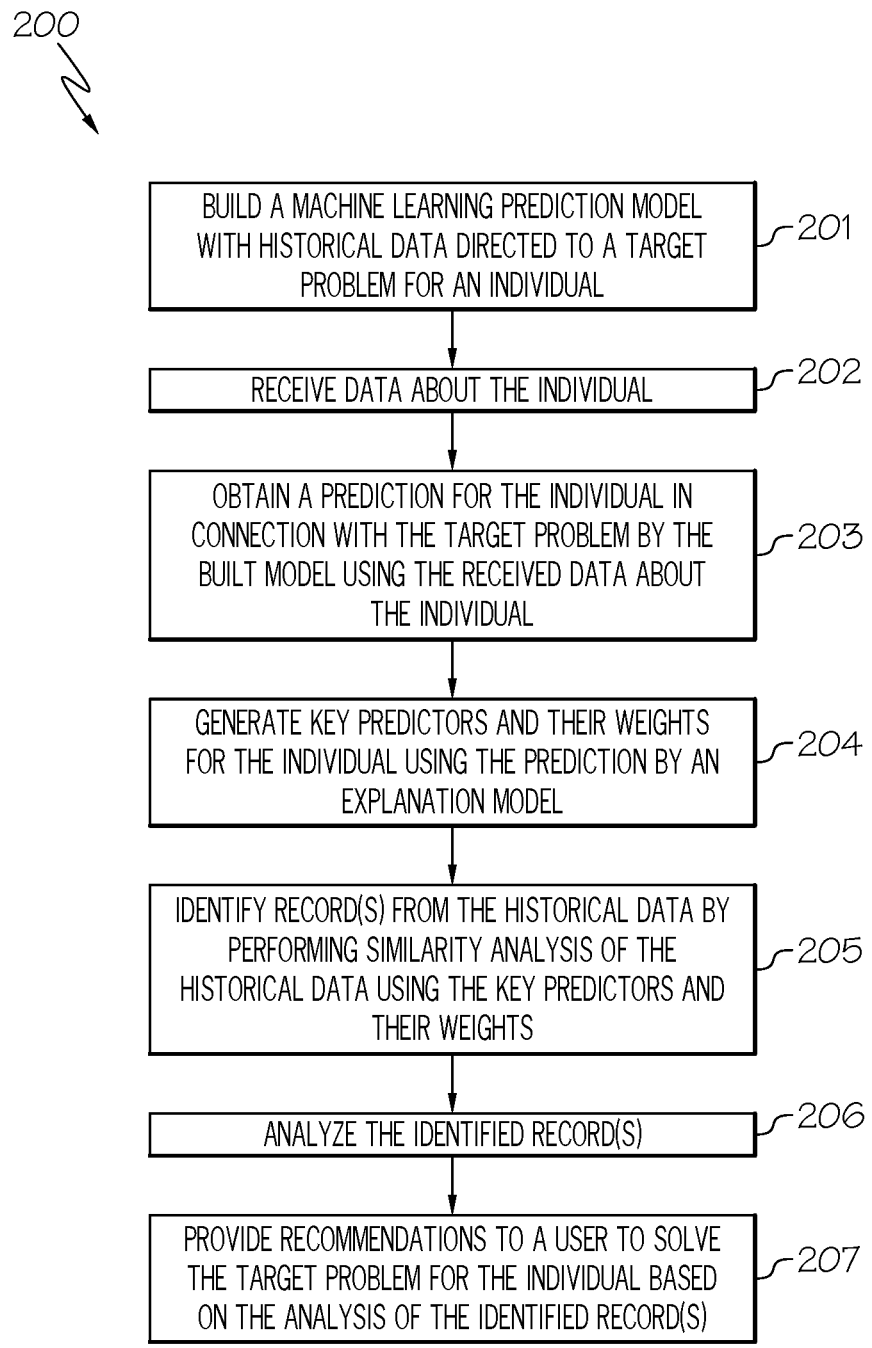
FIG. 2 is a flowchart of a method for providing personalized recommendations to address a target problem in accordance with an embodiment of the present invention.
Figure 3:
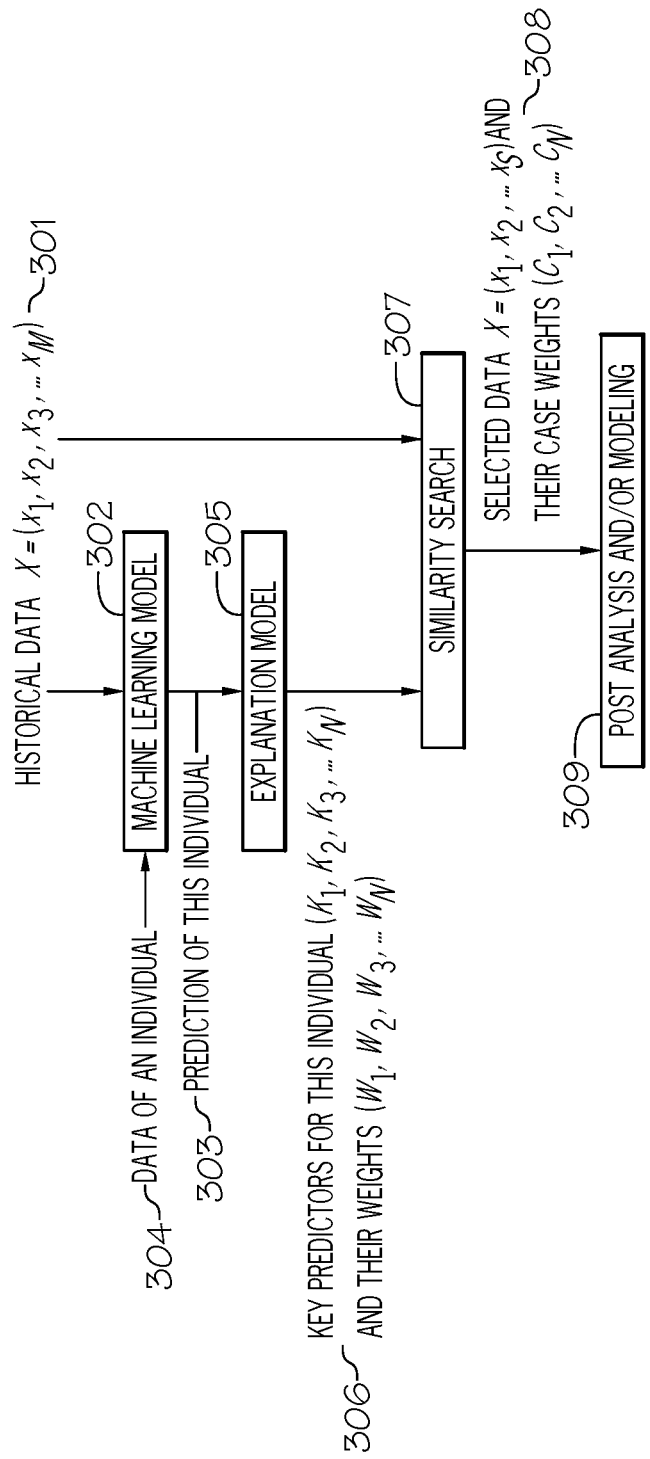
FIG. 3 illustrates the steps involved in providing personalized recommendations to address a target problem in accordance with an embodiment of the present invention.
Figure 7:
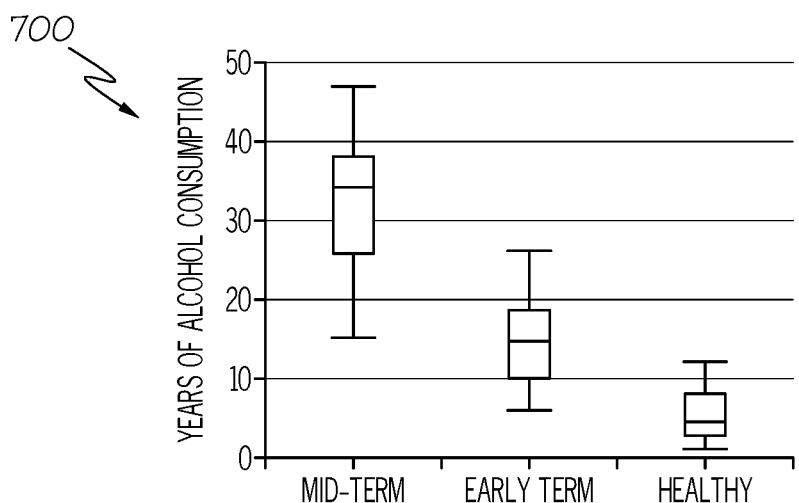
FIG. 7 is a graph of a relationship between cancer and years of alcohol consumption for the closely related population based on the table shown in FIG. 6 in accordance with an embodiment of the present invention.
Figure 8:
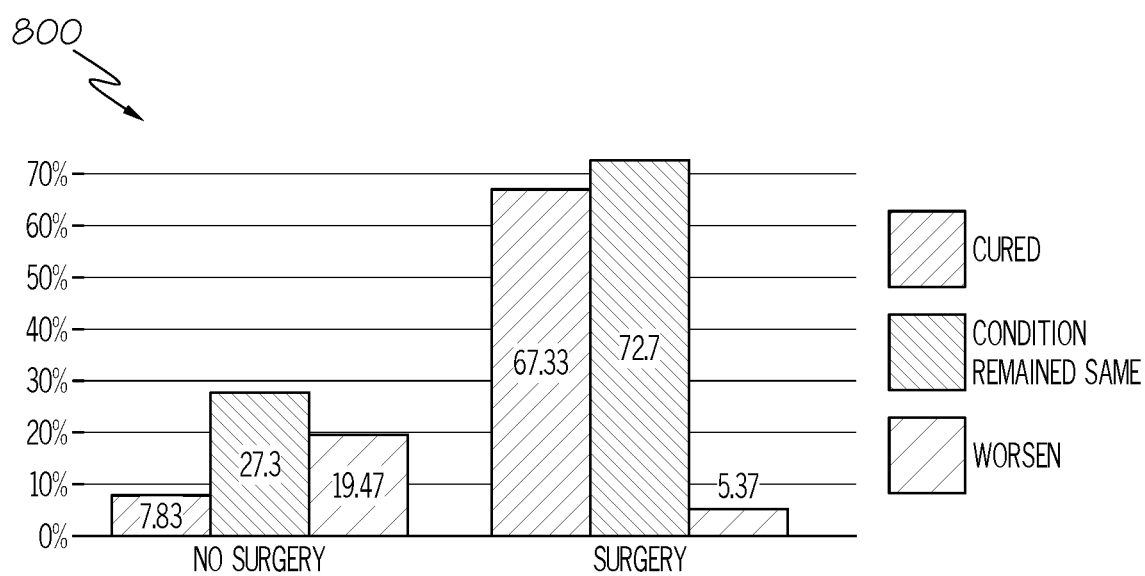
FIG. 8 is a bar graph showing the percentage of the recommended similar population that chose surgery as well as the recovery rate based on the table shown in FIG. 6 in accordance with an embodiment.
Figure 9:
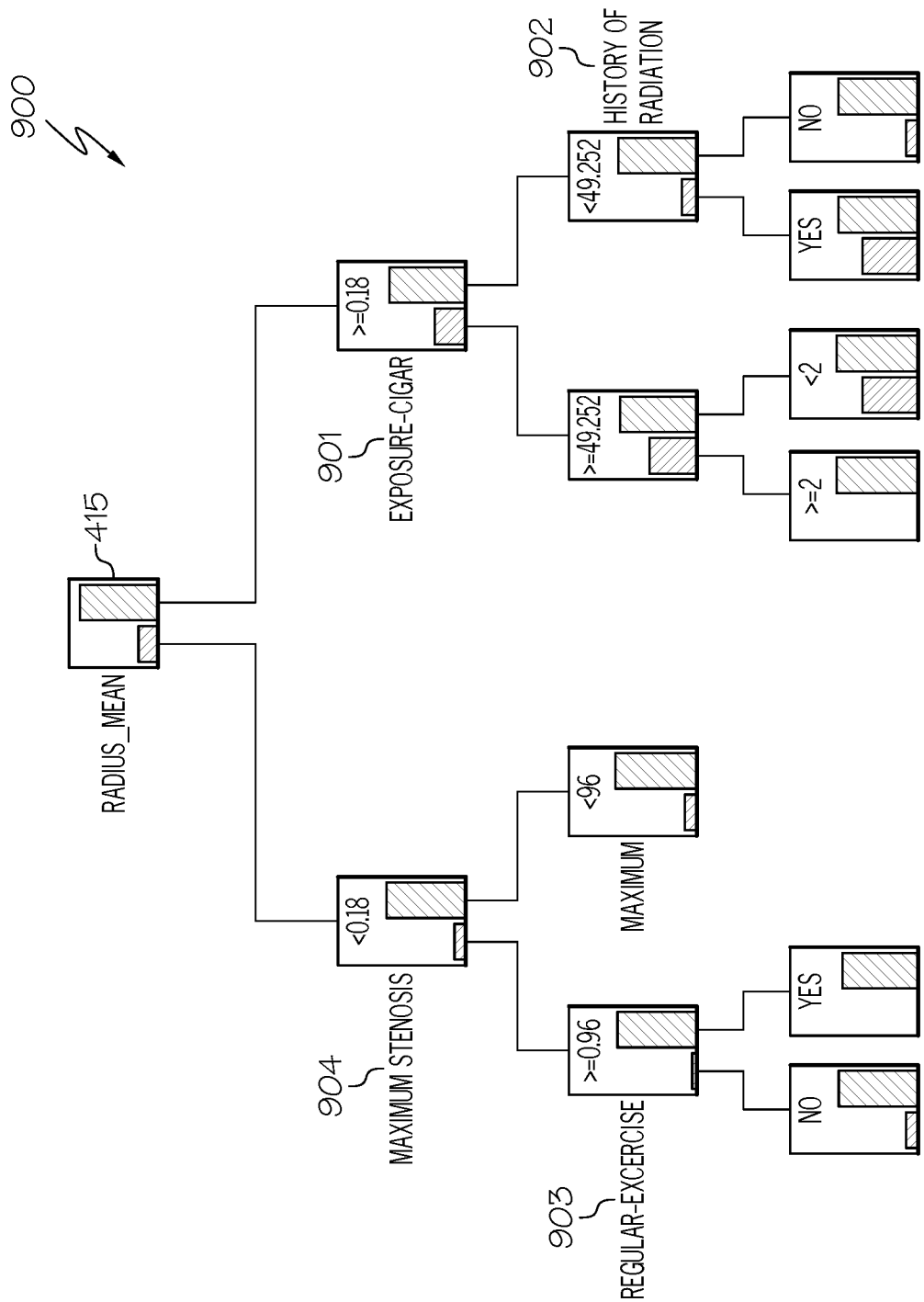
FIG. 9 is a tree structure illustrating in detail the effects of the sub-predictors used to form the value of the key predictors for the closely related population based on the table shown in FIG. 6 in accordance with an embodiment of the present invention.

The embodiments of the present invention provide a means for providing personalized recommendations to address a target problem based on exploring a population closely related to the individual with respect to the target problem as discussed below in connection with FIGS. 2-9. FIG. 2 is a flowchart of a method for providing personalized recommendations to address a target problem. FIG. 3 illustrates the steps involved in providing personalized recommendations to address a target problem. FIG. 4 illustrates using historical data to build the machine learning prediction model which provides a prediction for the individual based on the received data about the individual concerning the target problem. FIG. 5 illustrates the explanation model identifying the key parameters used to classify the person as being early stage breast cancer. FIG. 6 illustrates identifying similar historical records to provide a "closely related population" using similarity analysis. FIG. 7 is a graph of a relationship between cancer and years of alcohol consumption for the closely related population based on the table shown in FIG. 6. FIG. 8 is a bar graph showing the percentage of the recommended similar population that chose surgery as well as the recovery rate based on the table shown in FIG. 6. FIG. 9 is a tree structure illustrating in detail the effects of the sub-predictors used to form the value of the key predictors for the closely related population based on the table shown in FIG. 6.

As stated above, FIG. 2 is a flowchart of a method 200 for providing personalized recommendations to address a target problem in accordance with an embodiment of the present invention.

Referring to FIG. 2, in conjunction with FIG. 1, in step 201, computing device 100 builds a machine learning prediction model with historical data directed to a target problem for an individual. In one embodiment, such historical data may be obtained from a user of computing device 100. In another embodiment, computing device 100 utilizes natural language processing to search and obtain publicly available data, such as on the Internet, pertaining to the target problem. For example, if the target problem of an individual relates to determining whether an individual is at risk for early stage breast cancer, then computing device 100 utilizes natural language processing to identify publications, articles, publications and other documents related to breast cancer based on identifying keywords, such as "breast cancer" and "early stage."

In one embodiment, the machine learning prediction model is a classification model that predicts class membership. In one embodiment, such a model utilizes algorithms for performing data mining and statistical analysis, determining trends and patterns in the historical data directed to the target problem for the individual.

In one embodiment, predictive analytics software utilizes algorithms to make such prediction models. In one embodiment, such algorithms are classifiers, which identify a category for the data. Some types of classifiers include time series algorithms, clustering algorithms, outlier detection algorithms, ensemble models, factor analysis, naïve Bayes, support vector machines, etc.

In one embodiment, the type of the prediction model of the present invention may be one of the following: ordinary least squares, generalized linear model (GLM), logistic regression, random forest, decision tree, neural network and multivariate adaptive regression splines (MARS).

In one embodiment, the prediction model is built by cleaning the historical data by removing outliers and treating missing data. The data may then be preprocessed into a form suitable for the chosen modeling algorithm. A subset of the data is specified to be used for training the model. Model parameters are then trained or estimated from the training data set. Model performance or goodness-of-fit tests are conducted to check the model adequacy. The validation of predictive modeling accuracy may then be performed on data that was not used for calibrating the model. The model may then be used for prediction once the performance is satisfactory.

In step 202, computing device 100 receives data about the individual. For example, if the target problem of the individual is directed to whether the individual is at risk for early stage breast cancer, then the data about the individual may include parameters that may be important to make such a determination, such as age, years of alcohol consumption and image parameters (e.g., radius mean, concavity mean, concave points mean).

In step 203, computing device 100 obtains a prediction for the individual in connection with the target problem by the built model using the received data about the individual. An illustration of steps 201-203 is provided in connection with FIG. 3.

FIG. 3 is an illustration of the steps involved in providing personalized recommendations to address a target problem in accordance with an embodiment of the present invention.

Referring now to FIG. 3, as shown in FIG. 3, historical data 301 ($X=(x_1, x_2, x_3, \ldots x_M,$ where M is a positive integer number)) is used to build the machine learning prediction model 302. Machine learning prediction model 302 then provides a prediction for the individual 303 based on the received data 304 about the individual concerning the target problem. An illustration of using historical data to build the machine learning prediction model which provides a prediction for the individual based on the received data about the individual concerning the target problem is provided in FIG. 4.

FIG. 4 illustrates using historical data to build the machine learning prediction model which provides a prediction for the individual based on the received data about the individual concerning the target problem in accordance with an embodiment of the present invention.

Referring now to FIG. 4, in conjunction with FIG. 3, FIG. 4 illustrates a snapshot of various fields of historical records 400 concerning parameters used in determining a diagnosis pertaining to early stage breast cancer (diagnosis of early stage breast cancer is indicated with a "B" under the column of "diagnosis" and those that are not diagnosed with early stage breast cancer are indicated with an "M" under the column of "diagnosis"). Such historical data 301 ($X=(x_1, x_2, x_3, \ldots x_N)$) is used to build a machine learning prediction model. Such historical data 301 may include records 400 (identified by identifiers 401 "id") that include parameters, such as the reappearance of cancer 402, and if so, the reappeared time 403. Other parameters include whether the cancer was cured 404, whether a surgical operation was used to treat the breast cancer 405, what medicine type was used 406, what was the medicine time (months) 407, diagnosis 408 (a "B" indicates that the person was diagnosed with early stage breast cancer and an "M" indicates that the person was not diagnosed with early stage breast cancer), age 409, weight 410 (e.g., weight in kg), whether the individual consumes alcohol 411 (a "1" indicates a yes and a "0" indicates a no), years of alcohol consumption 412, whether the user smokes 413 (a "1" indicates a yes and a "0" indicates a no), years of smoking 414, and an image parameter, such as the radius mean 415 (radius_mean).

Additionally, FIG. 4 illustrates the receipt of individual data 304 that includes parameters, such as id 401, age 409, weight 410, whether the individual consumes alcohol 411, years of alcohol consumption 412, whether the individual smokes 413, years of smoking 414 and the radius mean 415.

In response to receiving such individual data 304, machine learning prediction model 302 of FIG. 3 provides a prediction 303 (see added diagnosis 408 of "B," indicating a prediction of early stage breast cancer).

Returning to FIG. 2, in conjunction with FIGS. 1 and 3-4, in step 204, computing device 100 generates key predictors and their weights for the individual using the prediction by an explanation model. In one embodiment, such key predictors correspond to the important parameters that are more likely to have an influence as to the outcome of the prediction, such as whether or not the individual is likely to have early stage breast cancer.

For example, as shown in FIG. 3, prediction 303 is inputted to an explanation model 305 generating key predictors for the individual ($K_1, K_2, K_3, \ldots K_N$, where N is a positive integer number) and their weights ($w_1, w_2, w_3, \ldots w_N$, where N is a positive integer number) 306. Such key predictors may correspond to the important parameters that were identified as determining an answer to the target problem.

In one embodiment, explanation model 305 uses an ensemble learning method, such as random forest, for classification, regression and other tasks that operates by constructing a multitude of decision trees at training time and outputting the class that is the mode of the class (classification) or mean prediction (regression) of the individual trees. By investigating which features (predictors, such as parameters) are used to construct the "best" trees, one is able to obtain an estimate of the feature (predictor) importance. That is, by investigating which predictors are used to construct the "best" trees, one is able to determine which are the important predictors or "key" predictors.

In another embodiment, explanation model 305 utilizes LIME (local interpretable model-agnostic explanations) to be applied to machine learning model 302. In one embodiment, LIME attempts to understand machine learning model 302 by perturbing the input of data samples and understanding how the predictions change. In this manner, key predictors may be identified.

In one embodiment, explanation model 305 establishes weights for the key predictors based on the individual of interest. For example, an importance weight is produced in the random forest training algorithm indicating the importance of those key predictors. In one embodiment, the higher the weight, the more important such a predictor is identified as determining an answer to the target problem.

In one embodiment, explanation model 305 establishes weights for the key predictors using LIME, where the predictors are weighted by the proximity of the sampled instances to the instance of interest.

An example of explanation model 305 identifying the key parameters is discussed below in connection with FIG. 5.

FIG. 5 illustrates explanation model 305 identifying the key parameters used to classify the person as being early stage breast cancer (diagnosis of "B") in accordance with an embodiment of the present invention.

As shown in FIG. 5, historical records 400 include various fields, such as those shown in FIG. 4, as well as additional image parameters, such as texture mean 501 (texture_mean), perimeter mean 502 (perimeter_mean), area mean 503 (area_mean), smoothness 504, compactness mean 505 (compactness_mean), concavity mean 506 (concavity_mean), concave points mean 507 (concave points_mean), symmetry 508, fractal dimension 509 (fractal_dimension) and radius set 510 (radius_set).

Out of these fields/parameters, explanation model 305 determined that for record 843786 (record 511) in which the individual was diagnosed as having early stage breast cancer, the parameters of age 409, years of alcohol consumption 412, the radius mean 415, the concavity mean 506 and the concave points mean 507 are the key parameters (key predictors) for classifying the person with early stage breast cancer.

Returning now to FIG. 2, in conjunction with FIGS. 1 and 3-5, in step 205, computing device 100 identifies one or more records 400 from historical data 301 providing a population closely related to the individual with respect to the target problem by performing a similarity analysis of historical data 301 using the key predictors and their weight as shown in FIG. 3.

Referring to FIG. 3, a similarity search 307 is performed on historical data 301 using the key predictors and their weights, the result of which corresponds to selected data ($X=(x_1, x_2, x_3, \ldots x_S$, where S is a positive integer number) and their case weights ($c_1, c_2, c_3, \ldots c_N$, where N is a positive integer number) 308. That is, the result of performing similarity search 307 on historical data 301 is identifying record(s) 400 providing the population closely related to the individual with respect to the target problem in which case weights are produced for each record in the closely related population. In one embodiment, such case weights are used in post analysis 309 as discussed further below.

In one embodiment, only the key predictors, rather than all the predictors, are used by computing device 100 to identify the records 400 of importance. Furthermore, in one embodiment, the weights for the key predictors ($R_n$=f(wn, Kn)) are utilized in identifying such records 400 of importance. In one embodiment, computing device 100 generates a value ("similarity value") in connection with performing the similarity analysis of historical data 301, where such values are used to identify those records 400 of importance. In one embodiment, such records 400 are identified with those having similarity values exceeding a threshold value.

In one embodiment, the similarity analysis involves performing cosine similarity on historical data 301 using the key predictors and their weights 306 as shown below.

$$k(x, y) = \frac{xy^T}{\|x\|\|y\|}$$

$$x = (w_{k1}x_{K1}, w_{k2}x_{K2}, w_{k3}x_{K3}, \ldots, w_{k3}x_{K3})$$

and $$y = (w_{k1}y_{K1}, w_{k2}y_{K2}, w_{k3}y_{K3}, \ldots, w_{k3}y_{K3})$$

In another embodiment, the similarity analysis involves performing the polynomial kernel on historical data 301 using the key predictors and their weights 306 as shown below.

$$k(x,y)=(\gamma x^\tau y+c_0)^d$$

In another embodiment, the similarity analysis involves performing the sigmoid kernel on historical data 301 using the key predictors and their weights 306 as shown below.

$$k(x,y)=\tanh(\gamma x^\tau y+c_0)$$

In a further embodiment, the similarity analysis involves performing the RBF (radial basis function) kernel on historical data 301 using the key predictors and their weights 306 as shown below.

$$k(x,y)=\exp(-\gamma\|x-y\|^2)$$

Furthermore, in one embodiment, the similarity analysis involves performing the chi-square kernel on historical data 301 using the key predictors and their weights 306 as shown below.

$$k(x, y) = \exp\left(-\gamma \sum_i \frac{(x[i] - y[i])^2}{x[i] + y[i]}\right)$$

An illustration of using the similarity analysis on historical data 301 using the key predictors and their weights 306 is discussed below in connection with FIG. 6.

FIG. 6 illustrates identifying similar historical records to provide a "closely related population" using similarity analysis discussed above in accordance with an embodiment of the present invention. A "closely related population," as used herein, refers to a population closely related to the individual with respect to a target problem (e.g., similar values for the key predictors, such as the parameters used in determining whether the individual has early stage breast cancer).

Referring to FIG. 6, the closely related population (records 742517 and 743789) (records 601A, 601B, respectively) is determined by computing the similarity via the important parameters (key predictors) used in determining whether an individual has early stage breast cancer, such as age 409, years of alcohol consumption 412, radius mean 415, concavity mean 506 and concave points mean 507. As shown in FIG. 6, records 601A, 601B contain similar values for such important parameters resulting in a diagnosis of early stage breast cancer.

Returning to FIG. 2, in conjunction with FIGS. 1 and 3-6, in step 206, computing device 100 analyzes the identified one or more records. "Analyzing," as used herein, refers to examining the records, including the fields of the records, to identify a population closely related to the individual with respect to the target problem. Furthermore, such analysis involves examining the values of the important parameters (key predictors) for the closely related population in addressing or solving the target problem.

In step 207, computing device 100 provides recommendations to a user to solve the target problem for the individual based on the analysis of the identified record(s) as shown in FIG. 3. For example, with respect to the target problem of breast cancer, the recommendation may be to have surgery versus chemotherapy or to have radiation treatment versus a combination of such options. Such recommendations are based on how the closely related population addresses or solves the target problem.

Referring to FIG. 3, post analysis and/or modeling 309 is performed on the identified records to provide the recommendations to the user to address the target problem involving a population closely related to the individual with respect to the target problem.

Various types of analysis may be performed on the identified records to generate the recommendations, such as the "what-if analysis" as shown in FIG. 7.

FIG. 7 is a graph 700 of a relationship between cancer and years of alcohol consumption for the closely related population based on the table shown in FIG. 6 in accordance with an embodiment.

Referring to FIG. 7, in a "what-if analysis," a determination is made as to how the diagnosis changes if a value of a key predictor changes. Such a determination may be made based on a graph, such as graph 700 which shows the relationship between the likelihood of breast cancer ("midterm," "early-term" and "healthy") in connection with the years of alcohol consumption.

Another type of analysis performed on the identified records to generate recommendations includes statistical analysis as shown in FIG. 8. FIG. 8 is a bar graph 800 showing the percentage of the recommended similar population that chose surgery as well as the recovery rate based on the table shown in FIG. 6 in accordance with an embodiment.

Referring to FIG. 8, in a "statistical analysis," an analysis may be performed on the recommended similar population, such as determining the percentage of patients that chose surgery and did not choose surgery as well as the recovery rate for each of these choices. Such a "similar population" refers to the "closely related population," such as records 601A, 601B which contain a population of the records of individuals closely related to the individual with respect to a target problem (e.g., similar values for the key predictors, such as the parameters of age 409, years of alcohol consumption 412, radius mean 415, concavity mean 506 and concave points mean 507, used in determining whether the individual has early stage breast cancer).

As shown in the example of FIG. 8, the percentage of those cured who elected to have surgery is 67.33%; whereas, the percentage of those cured who elected to not have surgery is 7.83%. The percentage of those whose condition remained the same for those who elected to have surgery is 72.7%; whereas, the percentage of those whose condition reminded the same for those who did not elect to have surgery is 27.3%. Furthermore, the percentage of those whose condition worsened who elected to have surgery is 5.37%; whereas, the percentage of those whose condition worsened who did not elect to have surgery is 19.47%. Based on such an analysis, a recommendation of having surgery may be provided to the user.

Another type of analysis performed on the identified records to generate recommendations includes modeling as shown in FIG. 9. FIG. 9 is a tree structure 900 illustrating in detail the effects of the "sub-predictors" used to form the value of the key predictors (e.g., radius mean 415) for the closely related population based on the table shown in FIG. 6 in accordance with an embodiment. For example, the sub-predictors of being exposed to cigars 901, the history of radiation 902, whether the user engages in regular exercise 903 and maximum stenosis 904 may be used to form the value of the key predictor of radius mean 415.

In one embodiment, such modeling is performed on weighted similar records forming the closely related population as well as the key predictors. In such an analysis (modeling analysis), it involves the effects of more predictors in comparison to statistical analysis.

As a result, the present invention provides the user a system for exploring a population that is similar to the individual with respect to a target problem. Recommendations are then created based on such an exploration.

In the manner discussed above, the embodiments of the present invention provide personalized recommendations to address a target problem based on exploring a population closely related to the individual with respect to the target problem Furthermore, the present invention improves the technology or technical field involving machine learning.

As discussed above, machine learning is the scientific study of algorithms and statistical models that computer systems use in order to perform a specific task effectively without using explicit instructions, relying on patterns and inference instead. Machine learning algorithms build a mathematical model based on sample data, known as "training data," in order to make predictions or decisions without being explicitly programmed to perform the task. Models, such as prediction models, created using machine learning are currently limited to predicting the value of a particular field. Such prediction models do not provide personalized recommendations to address a target problem involving a population closely related to the individual with respect to the target problem. That is, machine learning prediction models are not able to address or solve concerns ("target issues") involving a population closely related ("closely related population") to the individual with respect to a target problem (e.g., what should the education plan for child A be?). For instance, machine learning prediction models are not able to solve a problem concerning which education plan should be used by child A by parents A and B. For example, when a couple seeks an education plan for their child A, children of group A have a similar age to child A, but children of group B have parents with a similar education background as the parents of child A. Current machine learning prediction models do not answer which group is better for referencing when the concern ("target issue") is education since they do not explore a population that is similar to the individual with respect to a target problem. Hence, current machine learning prediction models fail to create recommendations by solving problems involving a population closely related to the individual with respect to the target problem.

The present invention improves such technology by building a machine learning prediction model directed to a target problem for an individual using historical data. Furthermore, data about the individual is received. For example, if the target problem of the individual is directed to whether the individual is at risk for early stage breast cancer, then the data about the individual may include parameters that may be important to make such a determination, such as age, years of alcohol consumption and image parameters (e.g., radius mean, concavity mean, concave points mean). After receiving data about the individual, a prediction for the individual is obtained in connection with the target problem by the built model using the received data about the individual. Key predictors (e.g., important parameters that are more likely to have an influence as to the outcome of the prediction) and their weight for the individual are generated using the prediction by an explanation model. Record(s) are identified from the historical data by performing similarity analysis of the historical data using the key predictors and their weight. Such records provide a population closely related to the individual with respect to the target problem. These records are then analyzed (e.g., what-if analysis, statistical analysis, modeling) and recommendations are provided to a user to solve the target problem for the individual based on the analysis of the identified record(s). As a result, the present invention provides the user a system for exploring a population that is similar to the individual with respect to a target problem. Recommendations are then created based on such an exploration. In this manner, there is an improvement in the technical field involving machine learning.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating personalized recommendations to address a target problem, the method comprising:
   preprocessing training data;
   training a machine learning prediction model using said preprocessed training data including historical data directed to said target problem for an individual, wherein said historical data is obtained from publicly available data using natural language processing;
   receiving data about said individual;
   obtaining a prediction for said individual in connection with said target problem by said machine learning prediction model using said received data about said individual;
   generating key predictors for said individual using said prediction by an explanation model;
   identifying one or more records from said historical data by performing similarity analysis of said historical data using said key predictors, wherein said one or more records provide a population closely related to said individual with respect to said target problem;
   analyzing said identified one or more records; and
   providing recommendations to a user to solve said target problem for said individual based on said analysis of said identified one or more records.

2. The method as recited in claim 1 further comprising:
   generating said key predictors and their weights for said individual using said prediction by said explanation model.

3. The method as recited in claim 2 further comprising:
   identifying said one or more records from said historical data by performing similarity analysis of said historical data using said key predictors and their weights.

4. The method as recited in claim 1, wherein said key predictors comprise parameters.

5. The method as recited in claim 4, wherein said key predictors comprise parameters that were identified as determining an answer to said target problem.

6. The method as recited in claim 1, wherein said analysis of said identified one or more records comprise what-if analysis, statistical analysis or modeling to provide said recommendations to said user to solve said target problem for said individual.

7. The method as recited in claim 1, wherein said similarity analysis of said historical data comprises using one of the following on said historical data:
   cosine similarity, polynomial kernel, sigmoid kernel, radial basis function kernel and chi-square kernel.

8. A computer program product for generating personalized recommendations to address a target problem, the computer program product comprising a computer readable storage medium having program code embodied therewith, the program code comprising the programming instructions for:
   preprocessing training data;
   training a machine learning prediction model using said preprocessed training data including historical data directed to said target problem for an individual, wherein said historical data is obtained from publicly available data using natural language processing;

receiving data about said individual;
obtaining a prediction for said individual in connection with said target problem by said machine learning prediction model using said received data about said individual;
generating key predictors for said individual using said prediction by an explanation model;
identifying one or more records from said historical data by performing similarity analysis of said historical data using said key predictors, wherein said one or more records provide a population closely related to said individual with respect to said target problem;
analyzing said identified one or more records; and
providing recommendations to a user to solve said target problem for said individual based on said analysis of said identified one or more records.

9. The computer program product as recited in claim 8, wherein the program code further comprises the programming instructions for:
generating said key predictors and their weights for said individual using said prediction by said explanation model.

10. The computer program product as recited in claim 9, wherein the program code further comprises the programming instructions for:
identifying said one or more records from said historical data by performing similarity analysis of said historical data using said key predictors and their weights.

11. The computer program product as recited in claim 8, wherein said key predictors comprise parameters.

12. The computer program product as recited in claim 11, wherein said key predictors comprise parameters that were identified as determining an answer to said target problem.

13. The computer program product as recited in claim 8, wherein said analysis of said identified one or more records comprise what-if analysis, statistical analysis or modeling to provide said recommendations to said user to solve said target problem for said individual.

14. The computer program product as recited in claim 8, wherein said similarity analysis of said historical data comprises using one of the following on said historical data: cosine similarity, polynomial kernel, sigmoid kernel, radial basis function kernel and chi-square kernel.

15. A system, comprising:
a memory for storing a computer program for generating personalized recommendations to address a target problem; and
a processor connected to said memory, wherein said processor is configured to execute the program instructions of the computer program comprising:
preprocessing training data;
training a machine learning prediction model using said preprocessed training data including historical data directed to said target problem for an individual, wherein said historical data is obtained from publicly available data using natural language processing;
receiving data about said individual;
obtaining a prediction for said individual in connection with said target problem by said machine learning prediction model using said received data about said individual;
generating key predictors for said individual using said prediction by an explanation model;
identifying one or more records from said historical data by performing similarity analysis of said historical data using said key predictors, wherein said one or more records provide a population closely related to said individual with respect to said target problem;
analyzing said identified one or more records; and
providing recommendations to a user to solve said target problem for said individual based on said analysis of said identified one or more records.

16. The system as recited in claim 15, wherein the program instructions of the computer program further comprise:
generating said key predictors and their weights for said individual using said prediction by said explanation model.

17. The system as recited in claim 16, wherein the program instructions of the computer program further comprise:
identifying said one or more records from said historical data by performing similarity analysis of said historical data using said key predictors and their weights.

18. The system as recited in claim 15, wherein said key predictors comprise parameters.

19. The system as recited in claim 18, wherein said key predictors comprise parameters that were identified as determining an answer to said target problem.

20. The system as recited in claim 15, wherein said analysis of said identified one or more records comprise what-if analysis, statistical analysis or modeling to provide said recommendations to said user to solve said target problem for said individual.

* * * * *